No. 636,142. Patented Oct. 31, 1899.
A. E. HODGSON.
SECONDARY BATTERY.
(Application filed July 31, 1899.)
(No Model.)

WITNESSES.
J. B. Howard
Gervase Appleyard.

INVENTOR.
Albert Edward Hodgson

UNITED STATES PATENT OFFICE.

ALBERT EDWARD HODGSON, OF HALIFAX, ENGLAND.

SECONDARY BATTERY.

SPECIFICATION forming part of Letters Patent No. 636,142, dated October 31, 1899.

Application filed July 31, 1899. Serial No. 725,641. (No model.)

*To all whom it may concern:*

Be it known that I, ALBERT EDWARD HODGSON, a subject of the Queen of Great Britain, residing at Halifax, in the county of York, England, have invented a certain new and useful Improvement in Secondary Batteries, of which the following is a specification.

My invention relates to an improvement in secondary batteries; and it consists in the use with the plates of same of separating mats or plates made of a woven glass flexible fabric, the object of my invention being to provide a device for separating the plates which shall be effective in operation and occupy but a very small space.

In the accompanying drawings I have illustrated two forms of the separating-mat made in accordance with my invention.

Figure 1:
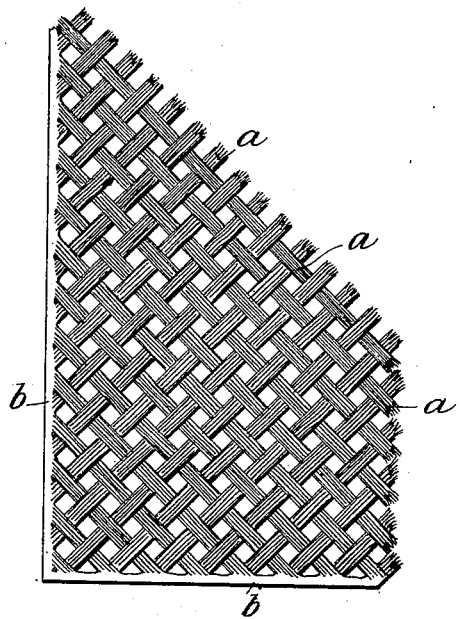
Figure 2:
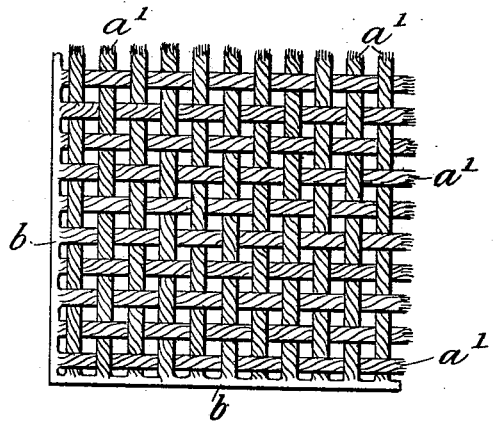

In the drawings, Figure 1 represents a corner portion of a mat in elevation; and Fig. 2, a similar view of a similar part of a mat, but formed in a different manner.

The fabric is preferably formed of a coarse or open nature, but it may be of a close texture, if desired, and the mats so formed are inserted between the plates constituting the battery.

In Fig. 1 the spun-glass fabrics are laid parallel into yarns or threads $a$, and these are woven or crossed into an ordinary mesh or fabric, the ends being fused by heat, so as to form edges $b$ to the mat, which is necessarily of a flexible nature, though said mat may be edged in other ways, if desired.

In Fig. 2 the fibers are first twisted or curled into yarns or threads $a'$ and then woven or crossed into a mesh or fabric, which in this case is shown as having the threads at right angles to the sides $b$.

What I claim is—

1. A separator for the plates of secondary batteries formed of glass fibers woven into a flexible fabric and secured at the edges thereof substantially as described.

2. A flexible separating-mat for a secondary battery formed of glass fibers woven into a fabric and having a fused edge substantially as described.

In testimony whereof I have hereunto set my hand in the presence of two subscribing witnesses.

ALBERT EDWARD HODGSON.

Witnesses:
J. B. HOWARD,
GERVASE APPLEYARD.